Aug. 7, 1928.
W. M. STEWART
TIRE PUMP
Filed Dec. 1, 1924
1,679,505
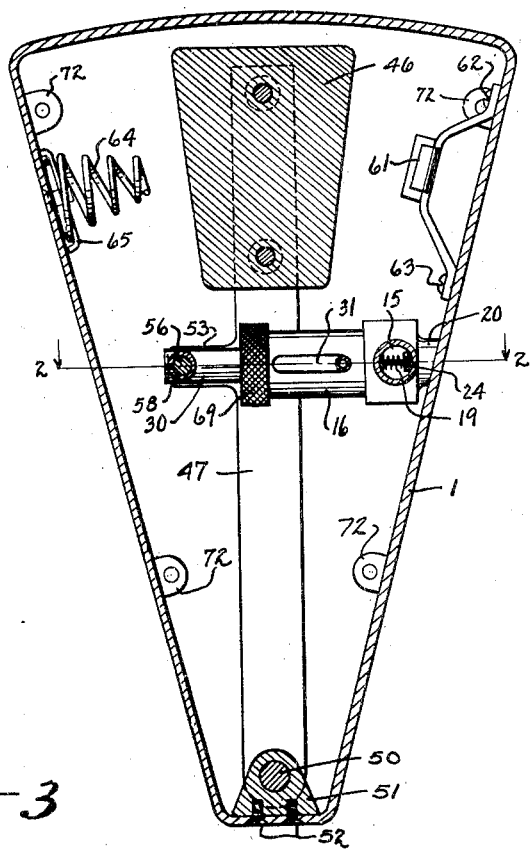
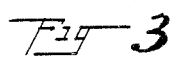
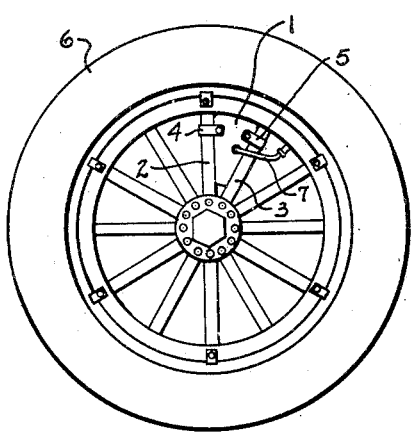
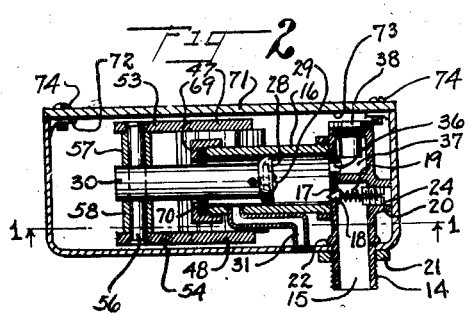
INVENTOR
W. M. Stewart
BY John D. Morgan
ATTORNEY Patented Aug. 7, 1928.

1,679,505

UNITED STATES PATENT OFFICE.

WILLIAM M. STEWART, OF ALBANY, NEW YORK; ANNIE E. STEWART ADMINISTRATRIX OF SAID WILLIAM M. STEWART, DECEASED.

TIRE PUMP.

Application filed December 1, 1924. Serial No. 753,395.

The invention relates to novel means and mechanism for maintaining air pressure in pneumatic tires of automotive vehicles, and more especially to such novel devices which automatically maintain a desired and predetermined tire pressure.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain principles of the invention.

Of the drawings:—

Fig. 1 is a vertical longitudinal section on line 1—1 of Fig. 2;

Fig. 2 is a full, horizontal transverse section on line 2—2 of Fig. 1; and

Fig. 3 is an elevation of a wheel with the pump affixed thereto.

Referring to the accompanying drawings, illustrating by way of example the present preferred embodiment of the invention, the tire pressure maintaining device is mounted upon the wheel of the automotive vehicle, and as shown in Fig. 3 it is mounted on a wheel of what is known as the artillery type, that is a spoke wheel. It could be mounted equally well on a disc or other type of wheel by any suitable fastening device.

A casing 1 is of a size and shape to fit within adjacent spokes 2 and 3 of the wheel, the casing being preferably fastened to both spokes by straps 4 and 5, or other suitable retaining devices. The pneumatic tire is indicated by 6, and a flexible air supplying tube 7 is connected from the pumping device to the usual air valve of the tire tube. The tube 7 will be connected to the air valve by any suitable union, which may be similar to those employed on the usual air pumps and air pressure supply pipes.

The air supply pipe 7 is connected by suitable means to a screw-threaded pipe or conduit 15, extending exteriorly from the casing 1, and connecting to the pump therewithin. The pumping device, located within the casing, comprises a cylinder 16, with a valve port 17 in the bottom or inner end thereof, communicating from the cylinder into the air conduit or pipe 15, already referred to. A spring-operating check valve 18 is seated in the port 17, the stem thereof being encircled by a helical spring 19.

A cylindrically-apertured projection 20 extends backwardly, and its rear end is shaped to rest accurately against the wall of the casing, and together with the fit of the conduit 15 in its aperture in the side of the casing serves to hold the pump fixedly in position. A nut 21 is screwed up on the screw-thread 14 of conduit against the outer wall of the casing 1, and a shoulder 22 on the conduit 15 abuts against the inner face of the casing wall. Thus the pump is held firmly and fixedly in proper position. The internal aperture in the boss 20 likewise permits the assembling of the valve 18. A screw 24 is screwed into the interior of part 20 to both render it air-tight, and to furnish the abutment for compressing the spring 19, and also to regulate the pressure of the spring upon the valve 18.

The pump is preferably provided with a cupped, flexible piston 28, of leather or other suitable material, and of a well-known type, which will admit air into the cylinder on the back or idle stroke, but will hold and compress the air within the cylinder on the forward or working stroke. Piston 28 is fixed by a washer and screw 29 to a piston rod 30. Air is supplied to the pump from the exterior of the casing to an intake conduit 31, communicating with the exterior air and with the interior of the cylinder just within the outer end of the stroke of the piston, the casing being otherwise air tight.

Means are provided for regulably controlling the pressure at which air will be supplied to the tire, and as embodied, a port 36 communicates from the inner end of the piston into a chamber 37, formed at the end of the cylinder, and structurally preferably in line with the conduit 15. The space in this cylinder is varied for the purpose indicated, and with this in view a screw-threaded plug 38 is screwed into the chamber. As this plug is screwed inwardly or outwardly, the size of the chamber is varied and thereby the pressure of the air forced into the tube 15 is correspondingly regulated as desired.

It will be obvious that when the pressure in the tire equals that in the pipe 15, no air will flow past the check-valve into the tire; but whenever the pressure on the valve falls below the highest pressure created by the pump, the air will flow past the check-valve into the tire. Thus the tire pressure will be kept at the desired and predetermined point. The inner end of the cylinder, as a matter of convenience in assembling, is preferably screw-threaded into a tapped screw-thread upon the casing or other part containing the conduit 15 and the chamber 37.

Means are provided by the invention for actuating the pump through the motion of the vehicle, and preferably also the vehicle wheel, the device operating by inertia or by gravity, and preferably by both, as is the case in the present embodiment. In the embodied form of said means, a weight 46 is fixed at the outer end of two spaced-apart levers 47 and 48, which are pivotally mounted at their lower ends upon a pin 50, this pin being carried in a supporting base 51, fixed to the bottom of the casing in any suitable manner, as by screws 52.

A pair of arms 53 and 54 extend outwardly from, and are preferably integral with, the corresponding levers 47 and 48. At their outer ends, the arms 53 and 54 are pivotally connected to the exterior end of piston 30, and for this purpose a pin 56 is mounted in, and extends across between, the arms, and passes loosely through an aperture near the exterior end of the piston rod 30. Spacing collars 57 and 58 are carried on the pin 56 at either side of the piston rod and between it and the arms 53 and 54. There will be a very slight arcing of the piston rod in this construction, but it is negligible with a piston of the kind preferably employed.

A piston stroke limiting stop 61 is preferably provided, mounted upon the inner wall of the casing by screws 62 and 63. The weight 46 strikes against this stop at the end of the working stroke of the pump, and thereby accurately limits the stroke of the pump at the inner end of the cylinder. There is preferably provided also a resilient stop at the opposite end of the path of travel of the weight 46, and for this purpose a spiral spring 64 is mounted in a seat 65 fixed to the inner wall of the casing. This not only serves to resiliently limit the stroke or travel of the weight 46, but also transfers some of the energy of the idle stroke to the working stroke of the mechanism.

It is highly desirable to keep the device as nearly dust-proof as possible, and this may be done by the common expedient of a dust strainer over the mouth of the supply pipe 31. If this be found undesirable, means may be provided for preventing the dust from entering the casing through the pump. A device of this kind is exemplarily shown, comprising a centrally-apertured, internally-screw-threaded cylindrical cap 69, within which is a flexible washer 70, of felt or other suitable material, centrally apertured for the piston rod 30 to pass therethrough, the washer being clamped against the outer end of the pump cylinder by the screw cap. This provides a dust-tight closure for the external end of the cylinder, which is sufficiently flexible to permit the slight arcing movement of the piston rod.

As a matter of construction, the casing is preferably made continuous as to all parts except one side, and the openings for the air-supply pipe 31 and the air supply pipe 15 from the pump to the tube, the latter, however, being closed by the flexible tube to the tire. The open side of the casing is closed air-tight by a plate 71, resting upon lugs 72 formed on the inside of the casing, and a gasket 73 forms an air-tight joint between this plate and the edges of the body of the casing. The plate 71 is fastened in air-tight position by screws 74, passing through holes in the plate and are screw-threaded into the lugs 72.

The invention in its broader aspects is not limited to the details of construction herein exemplarily shown and described, but departures may be made therefrom, within the scope of the accompanying claims, without departing from the principles of the invention and without sacrificing its chief advantages.

What I claim is:—

1. A tire pump mechanism mounted on an automotive vehicle wheel and including, in combination, a pump and means including an oscillating weight carrying member associated with said pump and actuated by gravity during the motion of said vehicle wheel to operate said pump to pump air into the tire of the wheel.

2. A tire pump mechanism mounted on an automotive vehicle wheel and including, in combination, a pump, and a gravity operated, radially extending, weight carrying lever rotatable with the vehicle wheel and oscillated by the motion of said wheel to actuate said pump.

3. A tire pump mechanism mounted on an automotive vehicle wheel provided with a tire, and including oscillating means freely movable to each end of its path of oscillation, and moved to each end of its path of oscillation by gravity, during rotation of the wheel, to actuate said pump to pump air into the tire.

4. A tire pump mechanism mounted on an automotive vehicle wheel provided with a tire, and including oscillating means freely movable to each end of its path of oscillation, and moved to each end of its path of oscillation by gravity, during rotation of the wheel, to actuate said pump to pump air into the tire, and resilient buffer means cooperating with said oscillating means.

In testimony whereof, I have signed my name to this specification.

WILLIAM M. STEWART.